(12) United States Patent
Tanabe

(10) Patent No.: US 7,489,738 B2
(45) Date of Patent: Feb. 10, 2009

(54) PRE-EMPHASIS AUTOMATIC ADJUSTING METHOD AND DATA TRANSMISSION SYSTEM USING SAME

(75) Inventor: Motoi Tanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/727,830

(22) Filed: Mar. 28, 2007

(65) Prior Publication Data

US 2007/0247191 A1 Oct. 25, 2007

(30) Foreign Application Priority Data

Mar. 30, 2006 (JP) ............... 2006-094866

(51) Int. Cl.
*H04L 27/04* (2006.01)
*H03K 17/16* (2006.01)
*H03K 19/003* (2006.01)
(52) U.S. Cl. .................... 375/295; 326/29; 326/86
(58) Field of Classification Search .......... 375/259, 375/295, 296
See application file for complete search history.

(56) References Cited

U.S. PATENT DOCUMENTS

2002/0037033 A1* 3/2002 During ................. 375/224
2002/0186048 A1* 12/2002 Tang et al. ............... 326/86
2004/0061922 A1* 4/2004 Mauro et al. ............. 359/279
2005/0057280 A1* 3/2005 Groen et al. ............. 326/86
2007/0247191 A1* 10/2007 Tanabe .................... 326/82

FOREIGN PATENT DOCUMENTS

| JP | 07-264248 | 10/1995 |
| JP | 08-321824 | 12/1996 |
| JP | 2001-144819 | 5/2001 |
| JP | 2005-094172 | 4/2005 |

* cited by examiner

*Primary Examiner*—Rexford Barnie
*Assistant Examiner*—Dylan White
(74) *Attorney, Agent, or Firm*—McGinn IP Law Group, PLLC

(57) ABSTRACT

A signal transmission system is provided which is capable of simplifying circuits and shortening time required for automatic adjustment of pre-emphasis. A signal having a single pulse pattern is generated by a single pulse pattern generating circuit. A signal having passed through a selector is divided into two signals whose phases are inverted and which are transmitted to a receiving circuit. An eye aperture of an eye waveform in a direction of time is measured by an eye aperture judging section by using the two signals and a sampling clock output from a sampling clock controlling section. An adjustment controlling section compares the measured eye aperture with a target value for judgment and transmits the judgment result to the transmitting circuit, where pre-emphasis is adjusted based on the judgment result.

20 Claims, 6 Drawing Sheets

US 7,489,738 B2

PRE-EMPHASIS AUTOMATIC ADJUSTING METHOD AND DATA TRANSMISSION SYSTEM USING SAME

BACKGROUND OF THE INVENTION

1. Field of the Invention

The present invention relates to a pre-emphasis automatic adjusting method and a data transmission system and more particularly to the pre-emphasis automatic adjusting method effective for pre-emphasis for high-speed transmission and the data transmission system employing the method.

The present application claims priority of Japanese Patent Application No. 2006-094866 filed on Mar. 30, 2006, which is hereby incorporated by reference.

2. Description of the Related Art

Conventionally, in a signal transmission system, by necessity of high-speed transmission of signals, pre-emphasis is performed on signals to be transmitted in a transmitting circuit and the signals are transmitted to a receiving circuit. In order to optically perform pre-emphasis in a transmitting circuit, pre-emphasis strength is automatically adjusted. The conventional automatic adjustment to be made to pre-emphasis strength is as follows:

The conventional signal transmission system having a function of automatically adjusting pre-emphasis strength, as shown in FIG. 6, includes a random pattern generating section 31, an automatic adjustment controlling section 32, a selector 33, and a transmitting circuit 34 on a transmitting circuit side 30 and a Veye (eye aperture) judging section 41, a sampling clock controlling section 42, a reference potential generating section 43, and an adjustment controlling section 44 on a receiving circuit 40. In this system, pre-emphasis strength is automatically adjusted so as to set an optimum value. When the automatic adjustment is started, a signal having a random pattern is applied from the random pattern generating section 31 to the selector 33 and, when an automatic adjustment controlling signal for the start of the automatic adjustment from the automatic adjustment controlling section 32 to the selector 33, a signal having a random pattern is supplied to the transmitting circuit 34 having a differential amplifier structure and a positive signal and an opposite signal are transmitted through each transmission path to the receiving circuit 40.

A potential of the signal to be received by the Veye judging section 41 is compared with a reference potential to be applied from the reference potential generating section 43. This comparison is sequentially performed while the referential potential is being changed, in order, by the referential potential generating section 43 from its low level to its high level and while a center of an eye aperture is being controlled by a sampling clock generated by the sampling clock controlling section 42. As a result, an eye aperture (Veye) occurring between a positive phase signal and an opposite signal in a direction of a signal amplitude (voltage direction) is judged and recognized.

The above comparison of signals to be received is made from a low level signal to a high level signal and, with a progress of the comparison, pre-emphasis strength to be provided from the transmitting circuit 34 to a transmitting signal is increased sequentially by a pre-emphasis strength adjusting signal to be supplied from the adjustment controlling section 44 to the transmitting circuit 34. FIG. 7(a) is a diagram illustrating a waveform at an initial stage of the adjustment. When the Veye judging section 41 judges that the eye aperture (Veye) has become maximum, that is, the adjustment has become optimum, the adjustment controlling section 44 transmits an adjustment completion signal to the automatic adjustment controlling section 32 to complete the automatic adjustment [see FIG. 7(b)].

Moreover, technologies related to an eye-pattern are disclosed in Patent Reference 1 (Japanese Patent Application Laid-open No. Hei 07-264248), Patent Reference 2 (Japanese Patent Application Laid Open No. 2005-094172), and Patent Reference 3 (Japanese Patent Application Laid-open No. 2001-144819). The technologies are related to technologies that deal with the eye aperture in a direction of an amplitude of the eye-pattern, that is, with the eye aperture in a direction of voltage. Furthermore, pre-emphasis technology that serves to uniformalization of performance of all the optical wavelength division multiplexed signal to be transmitted via an optical transmission path is disclosed in Patent Reference 4 (Japanese Patent Application Laid-open No. Hei 8-321824).

However, the above conventional technologies have problems. That is, in all of the above technologies, it is necessary that the random pattern generating section 31 is provided on the transmitting circuit side 30 as an essential element. This presents a problem in that a circuit scale is made to be large and an increase in a circuit area required on a semiconductor substrate is unavoidable. Moreover, in order to detect a received eye aperture (Veye), a step of finely changing a reference potential for comparison and judgment is necessary and indispensable, which causes time required for the adjustment of pre-emphasis to be longer.

The technologies disclosed in the Patent References 1, 2, and 3, as described above, are related to the eye aperture in a direction of an amplitude of the eye-pattern, that is, to the eye aperture in a direction of a voltage and, therefore, have the same problems as described in the above prior art. Also, in the technology disclosed in the Patent Reference 4, an optical signal to noise ratio is used for optimal setting of the pre-emphasis, there are the similar problems as with the above other conventional technologies.

SUMMARY OF THE INVENTION

In view of the above, it is an object of the present invention to provide a pre-emphasis automatic adjusting method which is capable of employing an eye aperture in an eye-pattern along a time axis for optimal setting of pre-emphasis strength to achieve high-speed transmission and a signal transmitting system using the method.

According to a first aspect of the present invention, there is provided a pre-emphasis automatic adjusting method for optimally adjusting pre-emphasis strength in a transmitting circuit to maximize a receiving eye aperture in a receiving circuit, the method including:

a step of receiving, on the receiving circuit side, a single pulse pattern to be transmitted from the transmitting circuit;

a step of measuring a time length of the receiving eye aperture in a direction of a time axis based on the received single pulse pattern;

a step of generating an adjusting signal for providing an instruction for the transmitting circuit making an adjustment of the pre-emphasis strength according to the time length of the receiving eye aperture in a direction of a time axis;

a step of transferring the generated adjusting signal to the transmitting circuit; and a step of optimally adjusting the pre-emphasis strength, on the transmitting circuit side, based on the adjusting signal transferred from the receiving circuit.

According to a second aspect of the present invention, there is provided a pre-emphasis automatic adjusting method for optimally adjusting pre-emphasis strength in a transmitting circuit to maximize a receiving eye aperture in a receiving circuit, the method including:

a step of receiving, on the receiving circuit side, a single pulse pattern to be transmitted from the transmitting circuit;

a step of measuring a time length of the receiving eye aperture in a direction of a time axis based on the received single pulse pattern;

a step of generating an adjusting signal for providing an instruction for the transmitting circuit making an adjustment of the pre-emphasis strength according to a result from comparison between the measured time length of the eye aperture in a direction of a time axis and a preset optimum value;

a step of transferring the generated adjusting signal to the transmitting circuit; and a step of optimally adjusting the pre-emphasis strength, on the transmitting circuit side, based on the adjusting signal transferred from the receiving circuit.

In the foregoing first and second aspect, a preferable mode is one wherein the single pulse pattern includes two single pulse patterns whose phases are inverted.

Also, a preferable mode is one wherein the time length of a receiving eye aperture in a direction of a time axis is a time length elapsed while a signal level of a signal having the single pulse pattern exceeds a specified signal level or less than the specified signal level.

According to a third aspect of the present invention, there is provided a signal transmission system including:

a receiving circuit for receiving a signal, and a transmitting circuit for transmitting the signal, which can optimally adjust pre-emphasis strength to maximize a receiving eye aperture in the receiving circuit, wherein the receiving circuit includes:

a receiving unit to receive a single pulse pattern to be transmitted from the transmitting circuit;

an eye aperture measuring unit to measure a time length of the receiving eye aperture in a direction of time based on the received single pulse pattern received by the receiving circuit;

a signal generating unit to generate an adjusting signal for providing an instruction for the transmitting circuit making an adjustment of the pre-emphasis strength according to the time length of the receiving eye aperture in a direction of a time axis; and a transferring unit to transfer the generated adjusting signal to the transmitting circuit; and wherein the transmitting circuit includes;

an adjusting unit to optimally adjust the pre-emphasis strength, on the transmitting circuit side, based on the adjusting signal transferred from the receiving circuit.

According to a fourth aspect of the present invention, there is provided a signal transmission system including:

a receiving circuit for receiving a signal, and a transmitting circuit for transmitting the signal, which can optimally adjust pre-emphasis strength to maximize a receiving eye aperture in the receiving circuit, wherein the receiving circuit includes:

a receiving unit to receive a single pulse pattern to be transmitted from the transmitting circuit;

an eye aperture measuring unit to measure a time length of the receiving eye aperture in a direction of time based on the received single pulse pattern received by the receiving circuit;

a signal generating unit to generate an adjusting signal for providing an instruction for the transmitting circuit making an adjustment of the pre-emphasis strength according to a result from comparison between the measured time length of the eye aperture in a direction of a time axis and a preset optimum value;

a transferring unit to transfer the adjusting signal generated by the signal generating unit to the transmitting circuit; and wherein the transmitting circuit includes;

an adjusting unit to optimally adjust the pre-emphasis strength based on the adjusting signal transferred from the transferring unit.

In the foregoing third and fourth aspect, a preferable mode is one wherein the single pulse pattern includes two single pulse patterns whose phases are inverted.

Also, a preferable mode is one wherein the time length of a receiving eye aperture in a direction of a time axis is a time length elapsed while a signal level of a signal having the single pulse pattern exceeds a specified signal level or less than the specified signal level.

With the above configuration, a single pulse pattern is transmitted to the receiving circuit and a time length of a receiving eye aperture in the single pulse pattern in a direction of a time axis received by the receiving circuit is measured and, based on the measured time length of the eye aperture along a time axis, a pre-emphasis strength is adjusted in the transmitting circuit and, therefore, it is possible to achieve simplification of the pre-emphasis adjusting circuit. In the conventional pre-emphasis automatic adjustment by using an eye aperture (Teye) in a direction of a voltage, a process of finely changing a reference potential to detect the eye aperture and of comparing the potentials and judging the eye aperture is required, however, in the embodiments of the present invention, unlike in the conventional technology, amounts of changes and time consuming processes are not necessary, thus enabling time required for the automatic adjustment to be shortened.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings. According to the present invention, in a transmitting circuit, in order to adjust pre-emphasis strength which maximizes a received eye aperture in a receiving circuit, a time length of an eye aperture along a time axis to be measured by the receiving circuit is used.

First Embodiment

Figure 1:
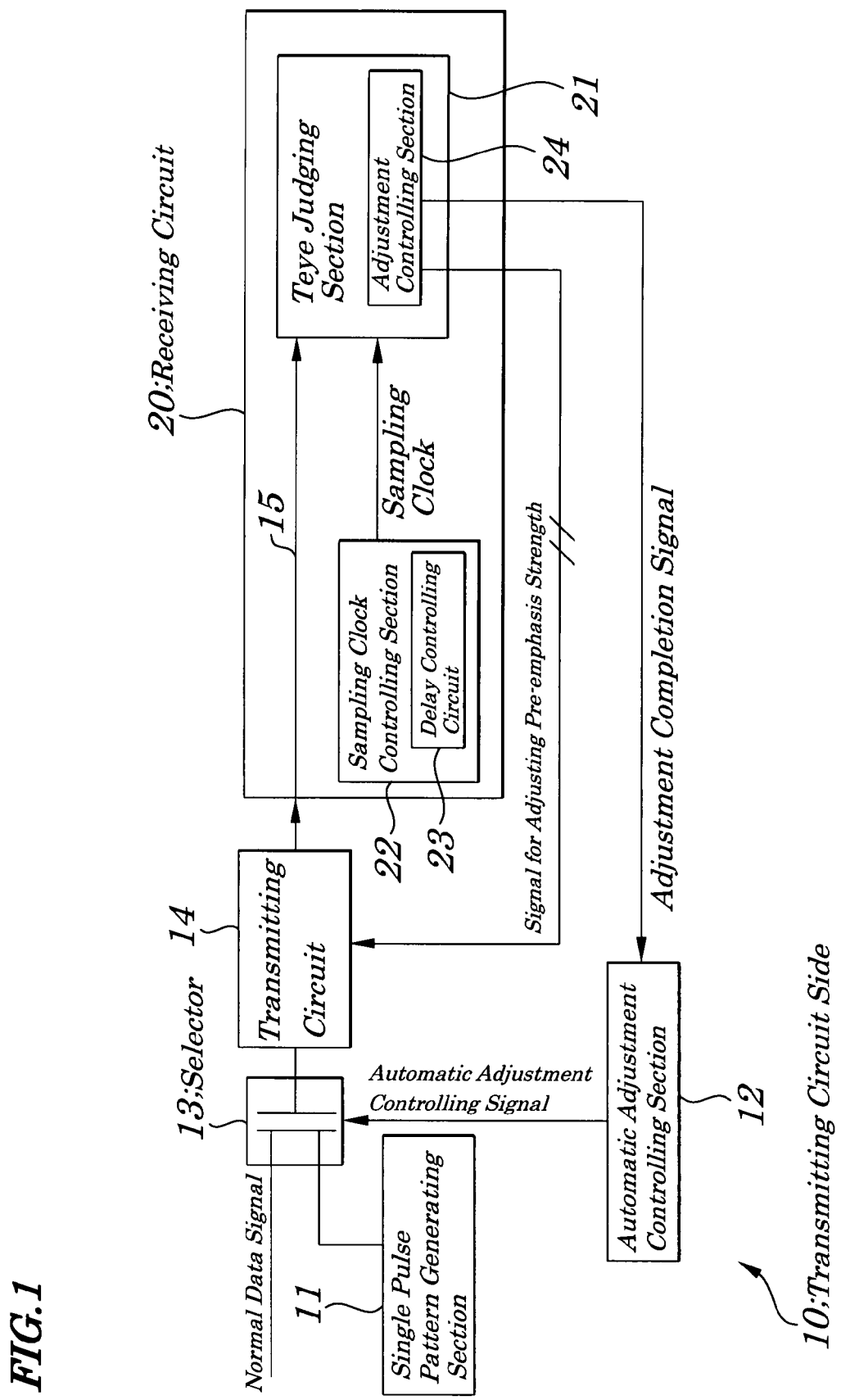
FIG. 1 is a diagram showing electrical configurations of a signal transmission system according to a first embodiment of the present invention.
Figure 2:
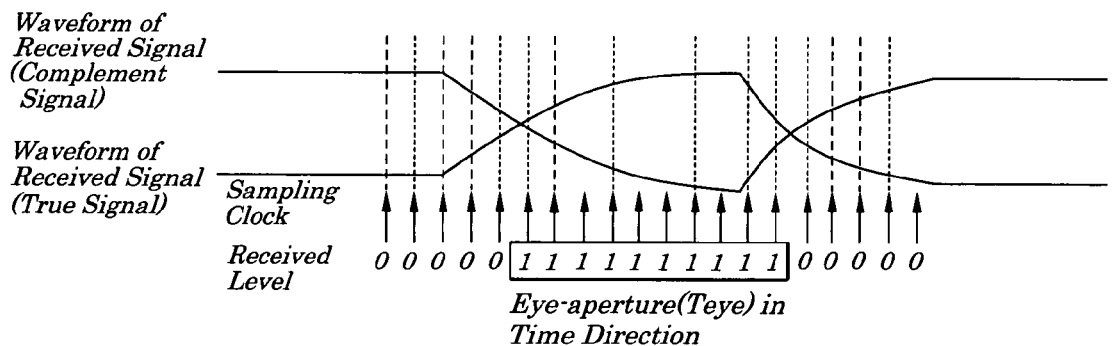
FIG. 2 is a diagram illustrating waveforms explaining operations of a Teye (eye aperture) judging section making up a receiving device of the signal transmission system according to the first embodiment of the present invention.
Figure 3:
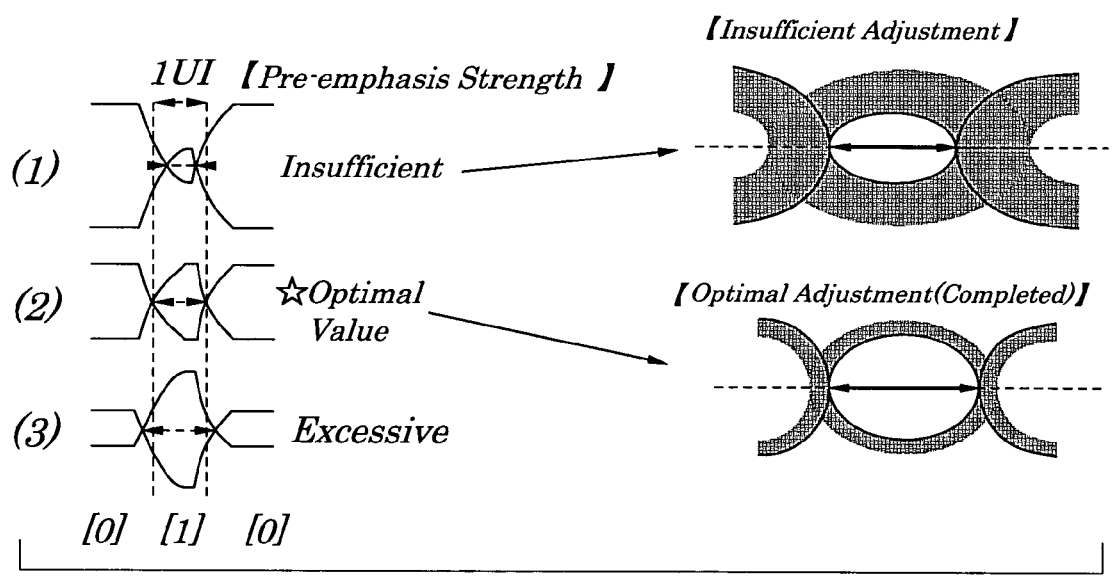
FIG. 3 is a diagram illustrating waveforms explaining operations of an adjustment controlling section making up the signal transmission system according to the first embodiment of the present invention.

FIG. 1 is a block diagram showing electrical configurations of a signal transmission system of a first embodiment of the present invention. FIG. 2 is a diagram illustrating waveforms explaining operations of a Teye (eye aperture) judging section making up a receiving device of the signal transmission system of the first embodiment. FIG. 3 is a diagram illustrating waveforms explaining operations of an adjustment controlling section making up the signal transmission system of the first embodiment. The signal transmission system 1 of the first embodiment is a system which uses an eye aperture in a single pulse pattern in a direction of time of a received signal for setting and controlling pre-emphasis of a transmitting signal. The signal transmission system 1, as shown in FIG. 1, includes a single pulse pattern generating section 11 mounted on a transmitting circuit side 10, an automatic adjustment controlling section 12, a selector 13, a transmitting circuit 14, a Teye judging section 21 mounted in a receiving circuit 20, a sampling clock controlling section 22, a delay controlling circuit 23, and an adjustment controlling section 24.

The single pulse pattern generating section 11 generates and outputs a signal having a single pulse pattern. The automatic adjustment controlling section 12 controls the start and completion of automatic adjustment of pre-emphasis. The selector 13 is a selecting unit to selectively output either of a normal data signal to be transmitted to the transmitting circuit side 10 or a signal having a single pulse pattern to be generated by the single pulse pattern generating section 11 to the transmitting circuit 14. The transmitting circuit 14 adjusts pre-emphasis strength of a signal having a single pulse pattern selected by the selector 13 based on an instruction from the adjustment controlling section 24 described later and transmits the signal to the receiving circuit 20 and transmits a normal data signal selected by the selector 13 to the receiving circuit 20 and outputs the two signals each having the single pulse pattern as the first signal (True signal) and the second signal (Complement signal) whose phases are inverted by using its differential amplifier configuration. The transmitting circuit 14 is connected to the Teye judging section 21 described below, via two transmission paths 15.

The Teye section 21, by using an eye waveform made up of waveforms of the received first and second signals each having a single pulse pattern and by using a sampling clock whose sampling timing delay is controlled, detects (hereinafter "measures") a time length of an eye aperture in a direction of time of a received signal in pre-emphasis strength provided to the received signal.

The sampling clock controlling section 22 embeds a delay controlling circuit 23 which changes sampling timing at regular intervals and outputs a sampling clock to be provided with timing to be changed. The adjustment controlling section 24 compares a Teye value obtained by the measurement by the Teye judging section 21 with a target value [for example, 1UI (UI is a unit interval)] and provides an instruction for adjustment of pre-emphasis strength to the transmitting circuit 14.

Next, operations of the signal transmission system of the embodiment are described by referring to FIGS. 1 to 3. When the automatic adjustment of pre-emphasis of the embodiment is started, the automatic adjustment controlling section 12 supplies an automatic adjustment controlling signal of a low level (0) to the selector 13. By this operation, a data signal to be transmitted from the transmitting circuit side 10 to the receiving circuit 20 is changed from a normal data signal to be fed from the data transmitting section (not shown) to a signal having a single pulse pattern to be used when the adjustment by the single pulse pattern generating section 11 is made to start the automatic adjustment.

A signal having a single pulse pattern transmitted from the transmitting circuit 14 is input to the Teye judging section 21 in the receiving circuit 20 and a sampling clock to be provided with timing changed at regular intervals is input from the sampling clock controlling section 22 to the Teye judging section 21. The Teye judging section 21 measures an eye waveform made up of waveforms of the first and second signals each having a single pulse pattern to be received and a time length of an eye aperture, in a direction of time, of an eye waveform made up of waveforms of the first and second signals to each of which pre-emphasis strength is provided according to a relation to sampling clocks supplied at regular intervals in time series and in order. A time length of the eye aperture in an eye waveform, in a direction of time, made up of the first and second signals to each of which pre-emphasis strength is provided is given by the following equation.

$$T\text{eye [ps]} = N \text{ [times]} \times \Delta T \text{ [ps]}$$

where N denotes the number of delay changes in a section in which a received signal level of the first signal of a positive phase is judged as "1" and where ΔT [ps] is delay time. By using this equation, a time length of the eye aperture in a direction of time is measured (see FIG. 2).

The adjustment controlling section 24 compares a time length of the Teye obtained by the measurement by the Teye judging section 21 with a target value (for example, 1UI) and transmits a signal for adjusting pre-emphasis strength to the transmitting circuit 14 to provide an instruction for the adjustment. Here, if a bit rate of each of the first and second signals is 10 bps, 1UI is 100 ps. When the detected Teye is smaller than 1UI, it is judged that pre-emphasis strength is insufficient [FIG. 3(1)] and an instruction for increasing pre-emphasis strength is provided by transmitting a signal for adjusting the pre-emphasis strength to increase pre-emphasis strength to the transmitting circuit 14. On the contrary, when the detected Teye is larger than 1UI, it is judged that pre-emphasis strength is excessive [FIG. 3 (3)] and an instruction for decreasing pre-emphasis strength is provided by transmitting a signal for adjusting the pre-emphasis to decrease the pre-emphasis strength to the transmitting circuit 14. Moreover, when the detected Teye coincides with 1UI, it is judged that the pre-emphasis strength is set optimally [FIG. 3(2)] and an adjustment completion signal is transmitted by the adjustment controlling section 24 to the automatic adjustment controlling section 12. The automatic adjustment controlling section 12 having received the adjustment completion signal changes an automatic adjustment controlling signal to be a high level (1). By this operation, the selector 13 switches its selection to the normal data transmission and the automatic adjustment is now completed.

Thus, according to the signal transmission system of the first embodiment, use of the first and second signals each having a single pulse pattern for adjustment of the pre-emphasis enables simplification of the signal generating circuit. Moreover, in the conventional automatic adjustment of the pre-emphasis using the Veye, steps of finely changing a reference potential to detect the Veye and of judging by comparison are required, however, unlike in the conventional technology, according to the first embodiment, only a step of measuring time during which a received level of the first signal exceeds "1" (one) is required and the conventional time consuming process is not necessary and, therefore, shortening of time required for automatic adjustment can be achieved.

Second Embodiment

Figure 4:
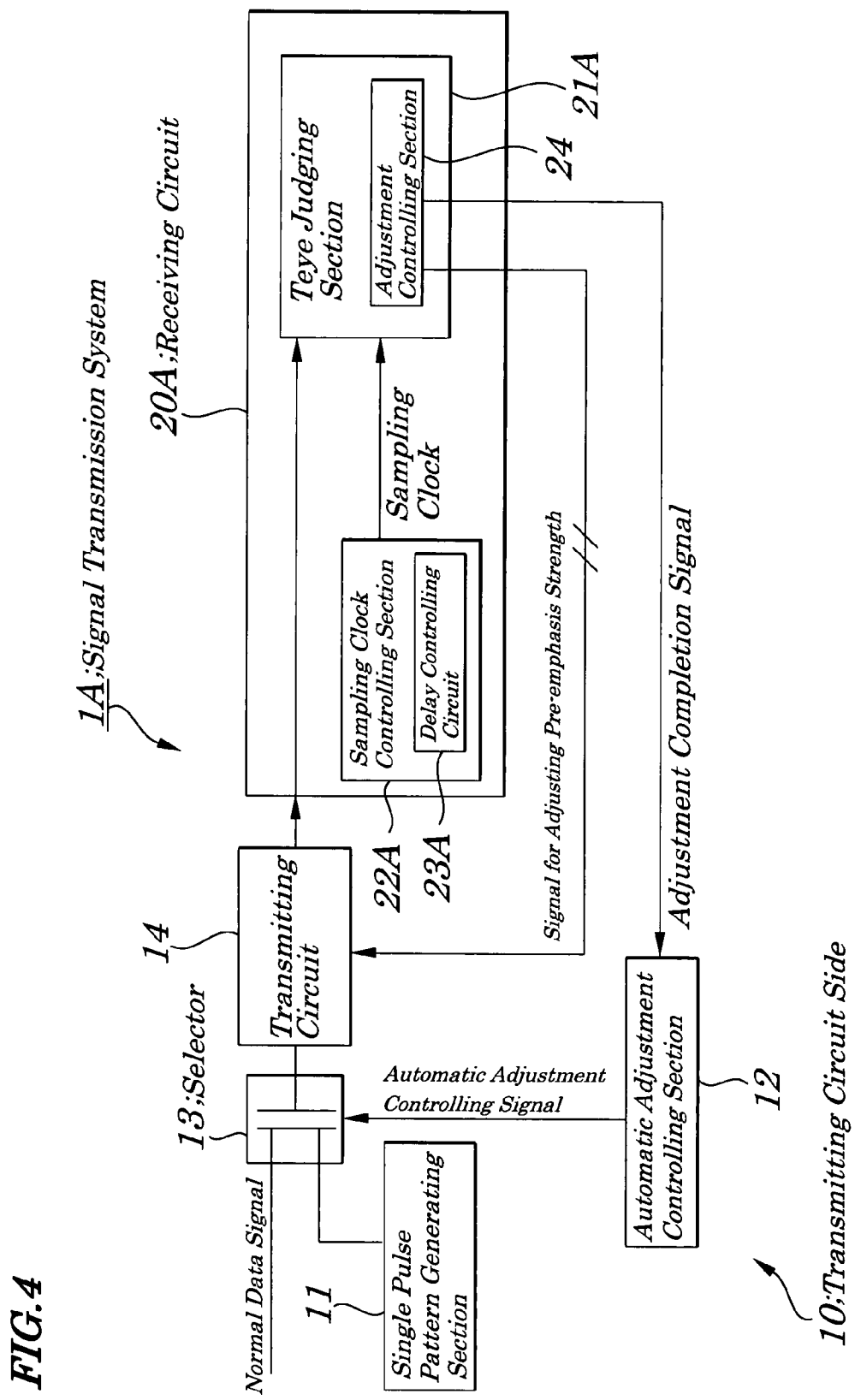
FIG. 4 is a diagram showing electrical configurations of a signal transmission system according to a second embodiment of the present invention.

FIG. 4 is a diagram showing electrical configurations of a signal transmission system according to a second embodiment of the present invention. Configurations of the second embodiment differ greatly from those in the first embodiment in that rough and fineness are provided to each of interval among sampling clocks. That is, the signal transmission system 1A of the second embodiment, as shown in FIG. 4, has a feature that time intervals among sampling clocks to be output from a sampling clock controlling section 22A embedding a delay control circuit 23A are configured as follows. That is, the delay controlling circuit 23A operates so that, during a time period from a specified time before a cross point where an eye waveform made up of a first signal and a second signal starts to a specified time after the cross point, short time intervals are provided and, during a time period from a specified time after the above cross point to a specified time before a cross point where the above eye waveform ends, time intervals each being longer than the above short time interval are provided and, during a time period from specified time before a cross point where the above eye waveform ends to a specified time after the cross point, short time intervals are provided.

A Teye judging section 21A measures, based on a relation between an eye waveform made up of the first and second signal waveforms each having a single pulse pattern to be received and sequential sampling clocks each having a different time interval on a time series, a time length of an eye aperture (Teye) in a direction of time, in an eye waveform made up of waveforms of the first signal and second signals in a pre-emphasis strength provided to the above first and second signals. Configurations of the second embodiment other than described above are the same as those in the first embodiment and, therefore, same reference numbers are assigned to corresponding components and their descriptions are omitted accordingly.

Next, operations of the signal transmission system of the second embodiment are described by referring to FIG. 4. Operations of the system of the second embodiment are the same as described in the first embodiment except the following points. That is, a first signal and a second signal each having a single pulse pattern transmitted from a transmitting circuit side 10 is input to the Teye judging section 21A in a receiving circuit 20A and sampling clocks each having a variable time interval are also input to the Teye judging section 21A from a sampling clock controlling section 22A. The Teye judging section 21A measures, based on a relation between an eye waveform made up of the first and second signal waveforms each having a single pulse pattern to be received and sequential sampling clocks each having a different time interval on a time series, a time length of an eye aperture (Teye), in a direction of time, of an eye waveform made up of waveforms of the first and second signals in a pre-emphasis strength provided to the above first and second signals.

An eye aperture (Teye) of an eye waveform in a direction of time, made up of waveforms of the first and second signals in a pre-emphasis strength provided to the above first and second signals is obtained as a time length during a section in which a received level of the first signal of a positive phase is judged to be "1", that is, as a sum of a product of the number of sampling clocks each having a short time interval and a short time interval after time cross point where the eye waveform made up of waveforms of the first and second signals each having a single pulse pattern starts, a product of specified number of sampling clocks each having a time interval being longer than the above short interval and a long time interval after the cross point, and a product of the number of sampling clocks each having a short time interval until time in a section where a received level of the first signal of a positive phase before a cross point in which the above eye waveform ends is "1" and time interval. The eye aperture, in a direction of time, of an eye waveform made up of waveforms of the first and second signals thus obtained is compared with a target value in the same way as employed in the first embodiment and, according to the result from the comparison, the pre-emphasis strength is adjusted and, at time of reaching optimal setting, the automatic adjustment of the pre-emphasis is completed.

Thus, according to the signal transmission system of the second embodiment, as in the first embodiment, an eye aperture in a direction of time can be measured. As a result, both simplification of circuits to be used and shortening of adjustment time attributable to the simplification of the circuit can be achieved.

Third Embodiment

Figure 5:
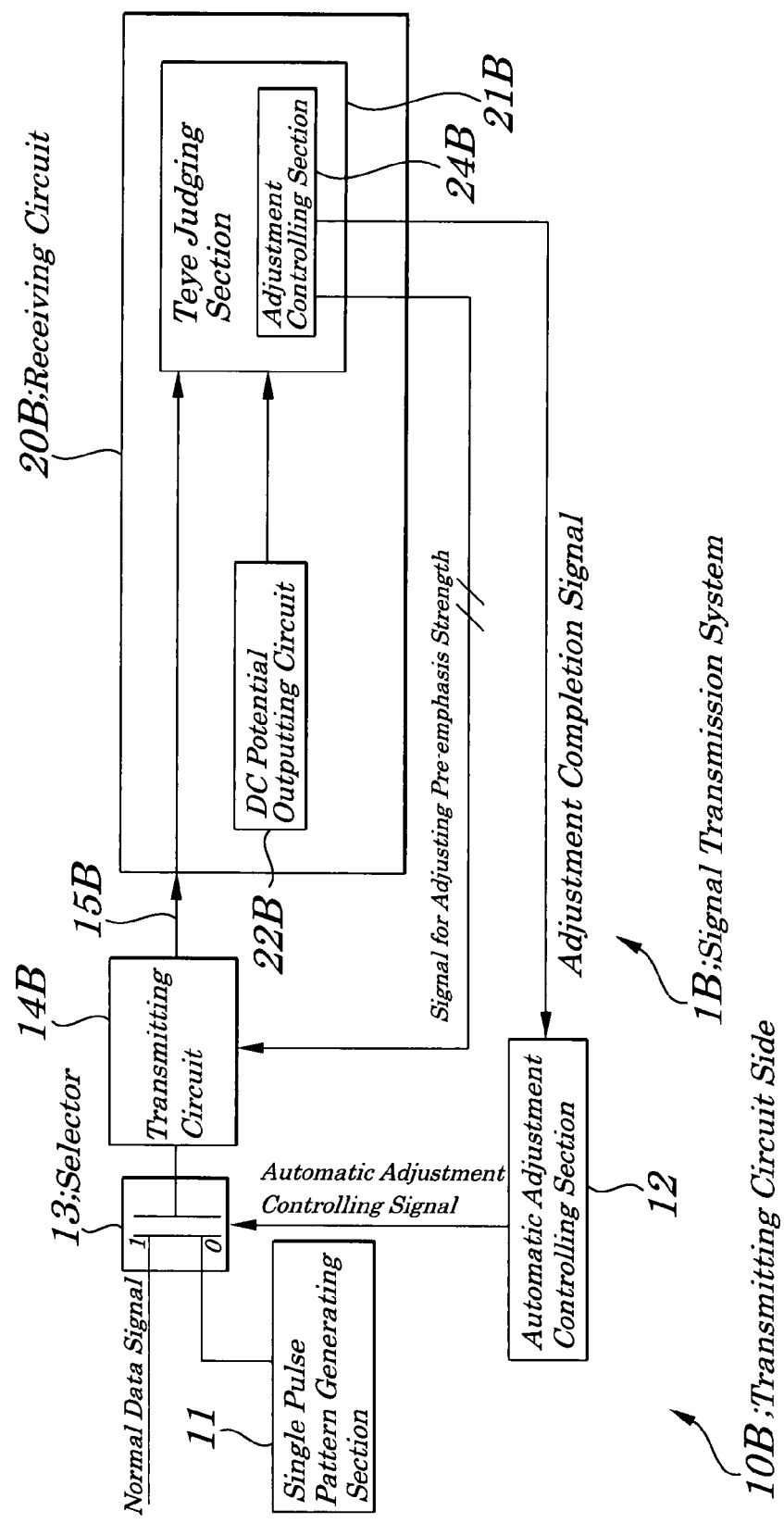
FIG. 5 is a diagram showing electrical configurations of a signal transmission system according to a third embodiment of the present invention.
Figure 6:
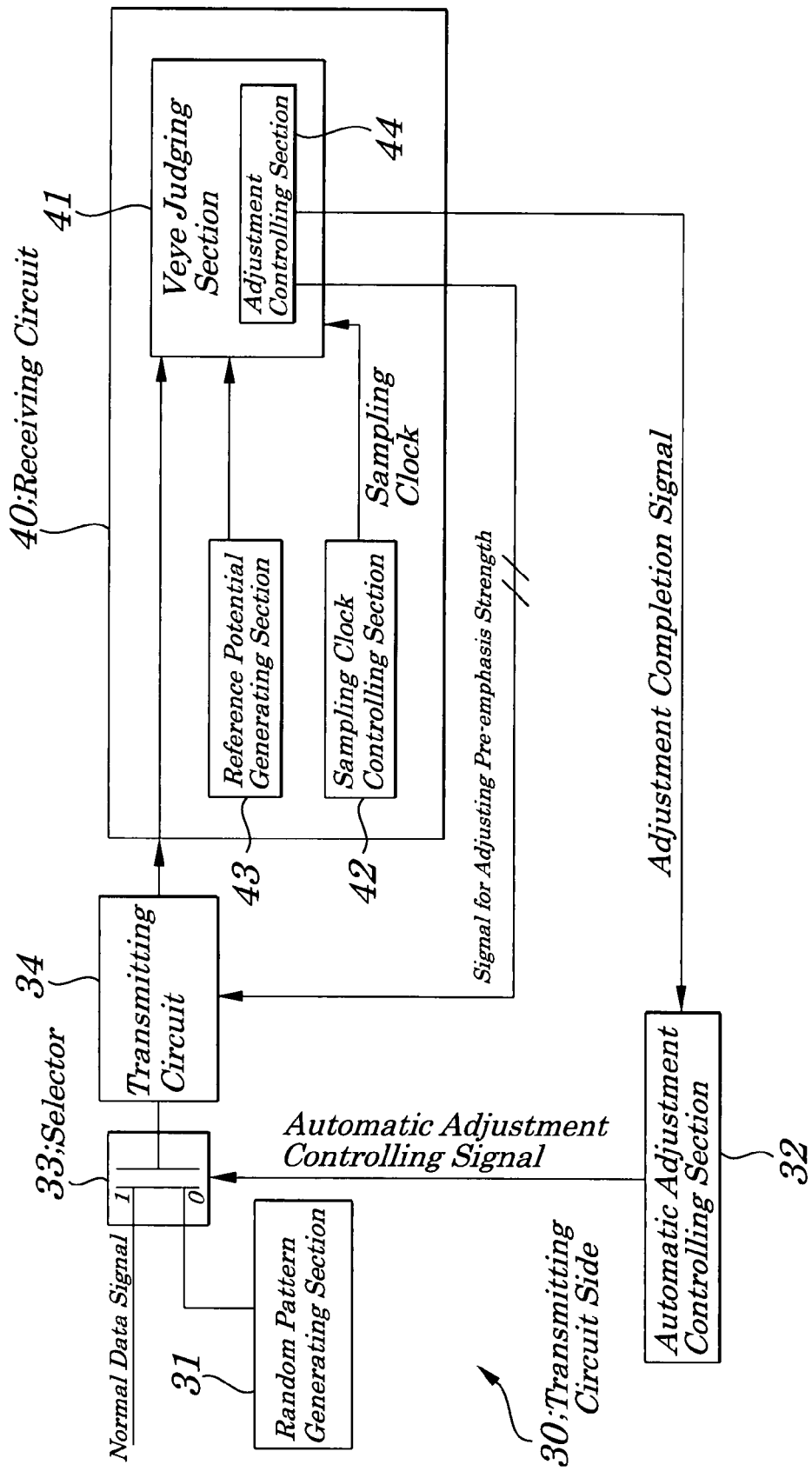
FIG. 6 is a diagram showing electrical configurations of a conventional signal transmission system.
Figure 7:
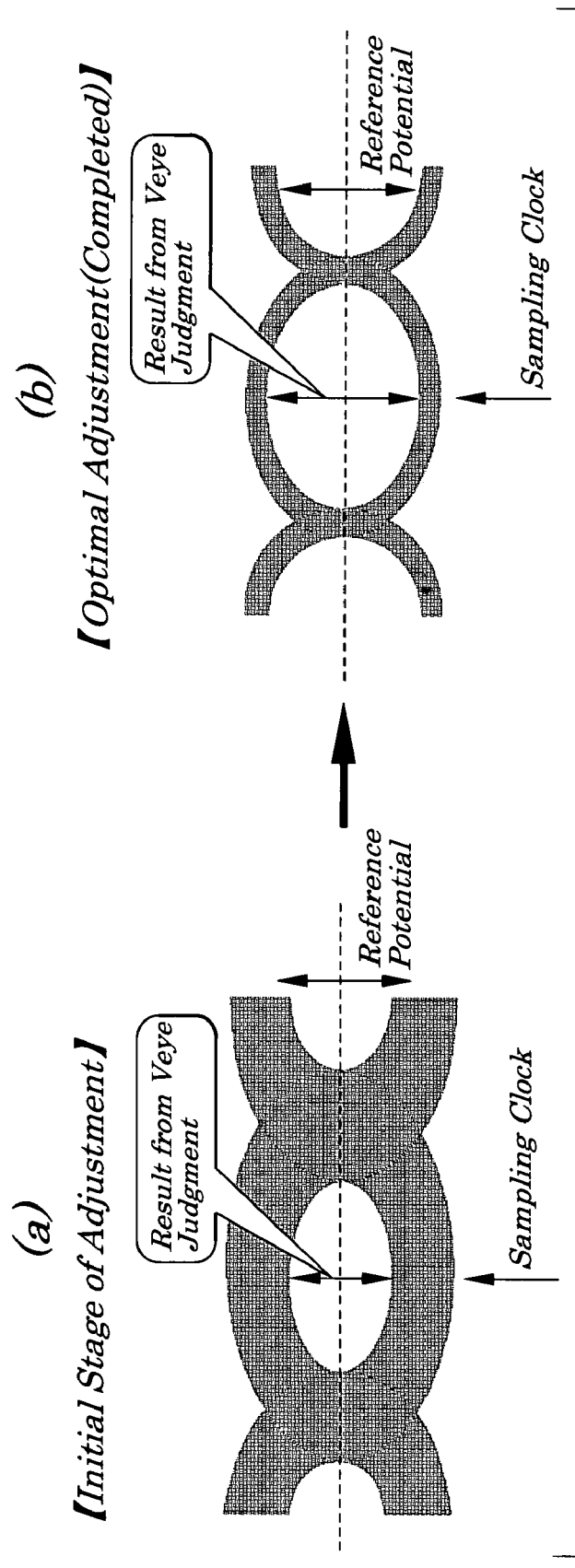
FIGS. 7(a) and 7(b) are diagrams illustrating waveforms explaining operations of an adjustment controlling section making up the conventional signal transmission system of FIG. 6.

FIG. 5 is a diagram showing electrical configurations of a signal transmission system according to the third embodiment of the present invention. Configurations of the signal transmission system of the third embodiment differ greatly from those in the first embodiment in that a single signal with a single pulse pattern is transmitted from a transmitting device to a receiving device and the received single signal with the single pulse pattern is compared with a target dc (direct current) potential to judge whether or not a signal level of the received single signal with the single pulse pattern is optimum. That is, the signal transmission system 1B of the third embodiment, as shown in FIG. 5, has a feature that a transmitting circuit 14B to transmit a pulse signal with a single pattern as a single pulse signal having a single pattern to a receiving circuit 20B is mounted on a transmitting circuit side 10B and a Teye judging section 21B to compare the single pulse signal having the single pulse pattern with a target dc potential applied from a DC potential outputting circuit 22B and an adjustment controlling section 24B to send back a pre-emphasis strength adjusting signal which is determined according to the comparison result provided by the Teye judging section 21B to the transmitting circuit 14B are mounted in a receiving circuit 20B in which the circuits on the transmitting circuit side 10B are connected to the receiving circuit 20B through one piece of a transmission path. Configurations of the third embodiment other than described above are the same as those in the first embodiment and, therefore, same reference numbers are assigned to corresponding components and their descriptions are omitted accordingly.

Next, operations of the signal transmission system of the third embodiment are described by referring to FIG. 5. Operations of the system of the third embodiment are the same as in the first embodiment except following points. That is, a signal of a single pulse pattern transmitted from the transmitting circuit 14B on the transmitting circuit side 10B is input to the Teye judging section 21B in the receiving circuit 14B and a voltage having a target dc potential is input from the dc potential outputting circuit 22B to the Teye judging section 21B. The Teye judging section 21B compares the single signal having the single pulse pattern with the target dc potential and outputs the result from the comparison to the adjustment controlling section 24B. The result indicates excessive, insufficient, or optimum pre-emphasis depending on whether the signal level of the received signal is larger or smaller than the target dc potential. The adjustment controlling section 24B sends back a signal for adjusting pre-emphasis strength to the transmitting circuit 14B where pre-emphasis strength is adjusted according to the result from the judgment.

Thus, according to the signal transmission system of the third embodiment, a signal level of a pulse signal having a single pulse pattern is compared with a target dc potential and a strength of the pre-emphasis can be adjusted according to the judgment result. As a result, both simplification of circuits used and shortening of adjustment time attributable to the simplification of the circuits can be achieved.

It is apparent that the present invention is not limited to the above embodiments but may be changed and modified without departing from the scope and spirit of the invention. For example, in the above embodiment, pulse intervals among signals each having a single pulse pattern are made equal, however, the present invention is not limited to this and the pulse intervals may be different from one another.

Additionally, the method of automatically adjusting pre-emphasis, the signal transmission system, or a like disclosed above may be applied to various transmission systems such as information processing systems, optical transmitting systems, or a like.

What is claimed is:

1. A pre-emphasis automatic adjusting method for optimally adjusting pre-emphasis strength in a transmitting circuit to maximize a receiving eye aperture in a receiving circuit, said method comprising:
   receiving, on a receiving circuit side, a single pulse pattern to be transmitted from said transmitting circuit;
   measuring a time length of said receiving eye aperture in a direction of a time axis based on the received single pulse pattern;
   generating an adjusting signal for providing an instruction for said transmitting circuit making an adjustment of said pre-emphasis strength according to said time length of said receiving eye aperture in a direction of a time axis;
   transferring the generated adjusting signal to said transmitting circuit; and
   optimally adjusting said pre-emphasis strength, on a transmitting circuit side, based on said adjusting signal transferred from said receiving circuit.

2. The pre-emphasis automatic adjusting method according to claim 1, wherein said single pulse pattern comprises two single pulse patterns having phases which are inverted.

3. The pre-emphasis automatic adjusting method according to claim 1, wherein said time length of a receiving eye aperture in a direction of a time axis is a time length elapsed while a signal level of a signal having said single pulse pattern exceeds a specified signal level or less than said specified signal level.

4. The pre-emphasis automatic adjusting method according to claim 1, wherein said measuring of said time length is performed by applying a sampling clock having a sampling timing delay which is controlled.

5. A pre-emphasis automatic adjusting method for optimally adjusting pre-emphasis strength in a transmitting circuit to maximize a receiving eye aperture in a receiving circuit, said method comprising:
   receiving, on a receiving circuit side, a single pulse pattern to be transmitted from said transmitting circuit;
   measuring a time length of said receiving eye aperture in a direction of a time axis based on the received single pulse pattern;
   generating an adjusting signal for providing an instruction for said transmitting circuit making an adjustment of said pre-emphasis strength according to a result from comparison between the measured time length of said eye aperture in a direction of a time axis and a preset optimum value;
   transferring the generated adjusting signal to said transmitting circuit; and
   optimally adjusting said pre-emphasis strength, on the transmitting circuit side, based on said adjusting signal transferred from said receiving circuit.

6. The pre-emphasis automatic adjusting method according to claim 5, wherein said single pulse pattern comprises two single pulse patterns having phases which are inverted.

7. The pre-emphasis automatic adjusting method according to claim 5, wherein said time length of a receiving eye aperture in a direction of a time axis is a time length elapsed while a signal level of a signal having said single pulse pattern exceeds a specified signal level or less than said specified signal level.

8. A signal transmission system comprising:
   a receiving circuit for receiving a signal, and
   a transmitting circuit for transmitting the signal, which can optimally adjust pre-emphasis strength to maximize a receiving eye aperture in said receiving circuit,
   wherein said receiving circuit comprises:
      a receiving unit to receive a single pulse pattern to be transmitted from said transmitting circuit;
      an eye aperture measuring unit to measure a time length of said receiving eye aperture in a direction of time based on the received single pulse pattern received by said receiving circuit;
      a signal generating unit to generate an adjusting signal for providing an instruction for said transmitting circuit making an adjustment of said pre-emphasis strength according to said time length of said receiving eye aperture in a direction of a time axis; and
      a transferring unit to transfer the generated adjusting signal to said transmitting circuit, and
   wherein said transmitting circuit comprises an adjusting unit to optimally adjust said pre-emphasis strength, on the transmitting circuit side, based on said adjusting signal transferred from said receiving circuit.

9. The signal transmission system according to claim 8, wherein said single pulse pattern comprises two single pulse patterns having phases which are inverted.

10. The signal transmission system according to claim 8, wherein said time length of a receiving eye aperture in a direction of a time axis is a time length elapsed while a signal level of a signal having said single pulse pattern exceeds a specified signal level or less than said specified signal level.

11. A signal transmission system comprising:
   a receiving circuit for receiving a signal, and
   a transmitting circuit for transmitting the signal, which can optimally adjust pre-emphasis strength to maximize a receiving eye aperture in said receiving circuit, wherein said receiving circuit comprises:
      a receiving unit to receive a single pulse pattern to be transmitted from said transmitting circuit;

an eye aperture measuring unit to measure a time length of said receiving eye aperture in a direction of time based on the received single pulse pattern received by said receiving circuit;

a signal generating unit to generate an adjusting signal for providing an instruction for said transmitting circuit making an adjustment of said pre-emphasis strength according to a result from comparison between the measured time length of said eye aperture in a direction of a time axis and a preset optimum value;

a transferring unit to transfer said adjusting signal generated by said signal generating unit to said transmitting circuit, and wherein said transmitting circuit comprises an adjusting unit to optimally adjust said pre-emphasis strength based on said adjusting signal transferred from said transferring unit.

12. The signal transmission system according to claim 11, wherein said single pulse pattern comprises two single pulse patterns having phases which are inverted.

13. The signal transmission system according to claim 11, wherein said time length of a receiving eye aperture in a direction of a time axis is a time length elapsed while a signal level of a signal having said single pulse pattern exceeds a specified signal level or less than said specified signal level.

14. The signal transmission system according to claim 11, wherein said receiving circuit further comprises a delay controlling circuit which changes sampling timing at regular intervals.

15. A signal transmission system comprising:
a receiving circuit for receiving a signal, and
a transmitting circuit for transmitting the signal, which can optimally adjust pre-emphasis strength to maximize a receiving eye aperture in said receiving circuit,
wherein said receiving circuit comprises:
    receiving means for receiving a single pulse pattern to be transmitted from said transmitting circuit;
    eye aperture measuring means for measuring a time length of said receiving eye aperture in a direction of time based on the received single pulse pattern received by said receiving circuit;
    signal generating means for generating an adjusting signal for providing an instruction for said transmitting circuit making an adjustment of said pre-emphasis strength according to said time length of said receiving eye aperture in a direction of a time axis; and
    transferring means for transferring the generated adjusting signal to said transmitting circuit; and wherein said transmitting circuit comprises adjusting means for optimally adjusting said pre-emphasis strength, on the transmitting circuit side, based on said adjusting signal transferred from said receiving circuit.

16. The signal transmission system according to claim 15, wherein said single pulse pattern comprises two single pulse patterns having phases which are inverted.

17. The signal transmission system according to claim 15, wherein said time length of a receiving eye aperture in a direction of a time axis is a time length elapsed while a signal level of a signal having said single pulse pattern exceeds a specified signal level or less than said specified signal level.

18. A signal transmission system comprising:
a receiving circuit for receiving a signal, and
a transmitting circuit for transmitting the signal, which can optimally adjust pre-emphasis strength to maximize a receiving eye aperture in said receiving circuit,
wherein said receiving circuit comprises:
    receiving means for receiving a single pulse pattern to be transmitted from said transmitting circuit;
    eye aperture measuring means for measuring a time length of said receiving eye aperture in a direction of time based on the received single pulse pattern received by said receiving circuit;
    signal generating means for generating an adjusting signal for providing an instruction for said transmitting circuit making an adjustment of said pre-emphasis strength according to a result from comparison between the measured time length of said eye aperture in a direction of a time axis and a preset optimum value;
    transferring means for transferring said adjusting signal generated by said signal generating means to said transmitting circuit, and wherein said transmitting circuit comprises adjusting means for optimally adjusting said pre-emphasis strength based on said adjusting signal transferred from said transferring means.

19. The signal transmission system according to claim 18, wherein said single pulse pattern comprises two single pulse patterns having phases which are inverted.

20. The signal transmission system according to claim 18, wherein said time length of a receiving eye aperture in a direction of a time axis is a time length elapsed while a signal level of a signal having said single pulse pattern exceeds a specified signal level or less than said specified signal level.

* * * * *